(12) United States Patent
Maghsoodnia et al.

(10) Patent No.: US 7,941,495 B2
(45) Date of Patent: *May 10, 2011

(54) MANAGEMENT CAPABILITIES FOR REAL-TIME MESSAGING NETWORKS

(75) Inventors: Mehdi Maghsoodnia, Menlo Park, CA (US); Lewis D. Roth, Los Angeles, CA (US); Frank Mangin, Santa Clara, CA (US); Yuri Khodosh, Sunnyvale, CA (US); Rahul Abhyankar, Santa Clara, CA (US); Alex Sherstinsky, Palo Alto, CA (US); Joseph Petviashvili, Foster City, CA (US); Eugene Mandel, Burlingame, CA (US); John Onusko, San Francisco, CA (US)

(73) Assignee: Actiance, Inc., Belmont, CA (US)

(*) Notice: Subject to any disclaimer, the term of this patent is extended or adjusted under 35 U.S.C. 154(b) by 7 days.

This patent is subject to a terminal disclaimer.

(21) Appl. No.: 12/511,713

(22) Filed: Jul. 29, 2009

(65) Prior Publication Data

US 2009/0288168 A1   Nov. 19, 2009

Related U.S. Application Data

(63) Continuation of application No. 10/212,129, filed on Jul. 31, 2002, now Pat. No. 7,596,599.

(51) Int. Cl.
*G06F 15/16*   (2006.01)
(52) U.S. Cl. ............................ 709/206; 709/207; 726/24
(58) Field of Classification Search .......... 709/206–207; 726/24
See application file for complete search history.

(56) References Cited

U.S. PATENT DOCUMENTS

| 5,943,478 | A  | * | 8/1999  | Aggarwal et al. ............... 726/3 |
| 5,999,932 | A  | * | 12/1999 | Paul ................................... 1/1 |
| 6,052,372 | A  | * | 4/2000  | Gittins et al. .................. 370/396 |
| 6,212,548 | B1 | * | 4/2001  | DeSimone et al. ............ 709/204 |
| 6,248,946 | B1 | * | 6/2001  | Dwek ............................. 84/609 |
| 6,260,148 | B1 | * | 7/2001  | Aggarwal et al. .............. 726/14 |
| 6,289,390 | B1 | * | 9/2001  | Kavner .......................... 719/310 |
| 6,292,800 | B1 | * | 9/2001  | Eldreth ........................... 707/769 |
| 6,301,609 | B1 | * | 10/2001 | Aravamudan et al. ........ 709/207 |
| 6,308,238 | B1 | * | 10/2001 | Smith et al. .................... 710/310 |
| 6,336,133 | B1 | * | 1/2002  | Morris et al. .................. 709/204 |
| 6,339,784 | B1 | * | 1/2002  | Morris et al. .................. 709/204 |
| 6,366,962 | B1 | * | 4/2002  | Teibel ............................ 709/245 |
| 6,389,132 | B1 | * | 5/2002  | Price ........................... 379/265.01 |
| 6,400,381 | B1 | * | 6/2002  | Barrett et al. .................. 715/758 |
| 6,408,066 | B1 | * | 6/2002  | Andruska et al. ......... 379/265.12 |
| 6,430,602 | B1 | * | 8/2002  | Kay et al. ....................... 709/206 |
| 6,449,344 | B1 | * | 9/2002  | Goldfinger et al. ......... 379/88.17 |
| 6,539,421 | B1 | * | 3/2003  | Appelman et al. ............ 709/206 |
| 6,549,937 | B1 | * | 4/2003  | Auerbach et al. ............. 709/206 |
| 6,650,890 | B1 | * | 11/2003 | Irlam et al. .................. 455/412.1 |

(Continued)

*Primary Examiner* — Kamal B Divecha
*Assistant Examiner* — Saket K Daftuar
(74) *Attorney, Agent, or Firm* — Kilpatrick Townsend & Stockton LLP

(57) ABSTRACT

Techniques for managing instant message (IM) communications are provided. In various embodiments, IM communications in a plurality of network implementations are managed using one or more policies. A policy in the one or more policies includes an action applicable for an IM communication. Once an IM communications is received from an IM client, a policy that is applicable for that IM communication is determined. After determining an applicable policy, an action associated with the policy for the instant message communication is performed. Examples of actions that may be taken include recording the IM communication, modifying the IM communication, blocking the IM communication, forwarding the IM communication, and the like.

34 Claims, 5 Drawing Sheets

U.S. PATENT DOCUMENTS

| | | | |
|---|---|---|---|
| 6,708,205 B2 * | 3/2004 | Sheldon et al. | 709/206 |
| 6,950,503 B2 * | 9/2005 | Schwartz et al. | 379/88.13 |
| 6,976,092 B1 * | 12/2005 | Daniell et al. | 709/246 |
| 6,981,223 B2 * | 12/2005 | Becker et al. | 715/753 |
| 6,983,370 B2 * | 1/2006 | Eaton et al. | 713/182 |
| 7,272,662 B2 * | 9/2007 | Chesnais et al. | 709/246 |
| 7,284,034 B2 * | 10/2007 | Matsa et al. | 709/206 |
| 7,675,903 B2 * | 3/2010 | Ozugur et al. | 370/352 |
| 7,707,401 B2 * | 4/2010 | Miller et al. | 713/153 |
| 2001/0049745 A1 * | 12/2001 | Schoeffler | 709/238 |
| 2003/0105825 A1 * | 6/2003 | Kring et al. | 709/206 |
| 2003/0125927 A1 * | 7/2003 | Seme | 704/3 |
| 2004/0039786 A1 * | 2/2004 | Horvitz et al. | 709/207 |
| 2004/0078443 A1 * | 4/2004 | Malik | 709/206 |
| 2004/0078444 A1 * | 4/2004 | Malik | 709/206 |
| 2004/0078445 A1 * | 4/2004 | Malik | 709/206 |
| 2004/0088423 A1 * | 5/2004 | Miller et al. | 709/229 |
| 2004/0103318 A1 * | 5/2004 | Miller et al. | 713/201 |
| 2004/0109518 A1 * | 6/2004 | Miller et al. | 375/356 |
| 2004/0111623 A1 * | 6/2004 | Miller et al. | 713/182 |
| 2004/0136386 A1 * | 7/2004 | Miller et al. | 370/401 |

* cited by examiner

MANAGEMENT CAPABILITIES FOR REAL-TIME MESSAGING NETWORKS

CROSS-REFERENCES TO RELATED APPLICATIONS

This application is a continuation of application Ser. No. 10/212,129, filed Jul. 31, 2002, the entire disclosure of which is herein incorporated by reference for all purposes.

BACKGROUND OF THE INVENTION

The present invention generally relates to telecommunications and more specifically to a system and method for managing instant message communications.

With the advent of the Internet, users have been provided with a faster electronic means of communicating with each other. For example, instant messaging allows users to interact in real-time communications through networks such as the Internet. In order to enable instant messaging, a user typically downloads an instant message (IM) client for a particular network implementation. Then, the user can communicate through instant messages with another user who has also downloaded an IM client of that particular network implementation.

The network implementations may be classified as commercial (also known as public) and enterprise (also known as private or proprietary) network implementations. Public network implementations allow anyone worldwide with their particular IM client to communicate on their network, while private network implementations only allow IM clients connected to a specific private network to communicate (typically on a much smaller scale, e.g., in an enterprise). Some examples of commercial network implementations include Microsoft (MSN), Yahoo!, America Online (AOL) Instant Messaging (AIM), ICQ, Short Message System (SMS), and the like. Some examples of enterprise network implementations include IBM/Lotus Sametime, Microsoft Exchange 2000, Microsoft RTC, Jabber, and the like. Each of these network implementations includes their own IM client and communicates through their own IM networks.

In an enterprise setting, users connected to an enterprise local area network (LAN) are often able to download any of the public IM network clients in addition to any supported enterprise IM network clients. Thus, users in the enterprise may be instant messaging with other users through private IM clients or public IM clients.

Typically, the instant message communications from users using private and public IM clients connected to the enterprise network occur unregulated. However, one way of regulating users on the enterprise network is the use of packet sniffers, which monitor the users' usage of the enterprise network. The sniffers can collect data and provide reports on the usage of IM networks. While packet sniffers can intercept and store copies of each instant message traversing the enterprise network, the sniffers can only collect data passively and are unable to act upon data captured.

BRIEF SUMMARY OF THE INVENTION

Techniques for managing instant message (IM) communications are provided. In various embodiments, systems, methods, apparatus, and computer-readable storage media are provided for managing IM communications in a plurality of network implementations using one or more policies. A policy in the one or more policies includes an action applicable for an IM communication. Once an IM communications is received from an IM client, a policy that is applicable for that IM communication is determined. After determining an applicable policy, an action associated with the policy for the instant message communication is performed. Examples of actions that may be taken include recording the IM communication, modifying the IM communication, blocking the IM communication, forwarding the IM communication, and the like.

In one embodiment of the present invention, techniques for managing instant message (IM) communications are provided. Instant message communications of a plurality of network implementations are managed using an instant message module that uses one or more policies. A policy in the one or more policies includes an action applicable for an IM communication.

In one embodiment, the techniques comprise receiving an instant message communication at the instant message module. The IM communication may be in a network implementation of one of the plurality of network implementations. Then, a policy is determined from the one or more policies that is applicable for the instant message communication. An action associated with the policy for the instant message communication is performed.

A further understanding of the nature and advantages of the invention herein may be realized by reference of the remaining portions in the specifications and the attached drawings.

DETAILED DESCRIPTION OF THE INVENTION

Figure 1:
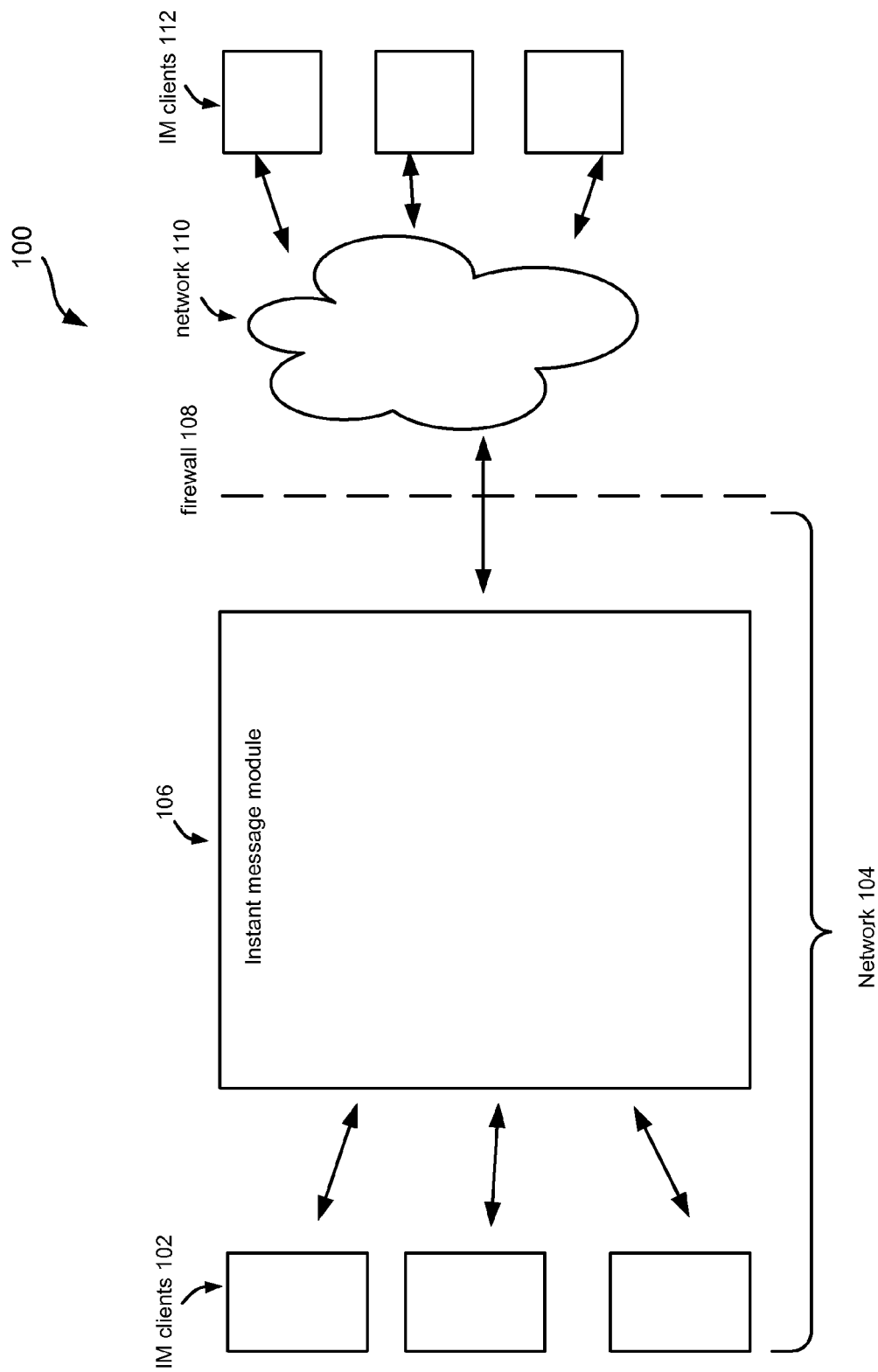
FIG. 1 depicts a system for processing instant messages according to one embodiment of the present invention.

FIG. 1 illustrates an instant message system 100 for processing instant messages according to one embodiment of the present invention. As shown, system 100 includes a plurality of instant message (IM) clients 102, a network 104, an instant message module 106, a firewall 108, a network 110, and a plurality of instant message clients 112 according to one embodiment.

IM clients 102 are used to send and receive instant message communications with other IM clients. IM clients may be installed on any computing device, such as a personal computer (PC), pocket PC, personal digital assistant (PDA), RIM blackberry device, telephone, cellular phone, pager, etc.

In one embodiment, IM clients 102 may send IM communications that include textual messages. Also, IM communications may be sent that signal configuration and/or control information, or indicate actions to be taken by an IM client 102. For example, IM communications include on-line and off-line indications for users, alerts, communications for sending files, voice, video, etc. For purposes herein, IM communications include any communications made for the purpose of instant messaging.

In one embodiment, IM clients 102 are IM clients of any network implementation. For example, the network implementations may include MSN, AIM, Yahoo!, ICQ, SMS, IBM/Lotus Sametime, Microsoft Exchange 2000, Microsoft RTC, Reuters Messaging, Bloomberg, and the like. In one embodiment, IM clients 102 of a particular network implementation communicate with each other through an IM network for the network implementation. An IM network is any network that is configured to allow instant messaging for a particular network implementation.

Network 104 is any network that can support instant messaging. For example, network 104 includes an enterprise local area network, an extranet, etc. In one embodiment, network 104 forms an enterprise network that is defined by firewall 108. In this embodiment, any devices behind firewall 108 are considered part of the enterprise network and other devices outside of firewall 108 are considered to be outside of the enterprise network. Accordingly, IM clients 102 and IM module 106 are considered part of the enterprise network. Although firewall 108 is shown, it will be understood that firewall 108 may not be included in system 100.

Network 110 is any network that is configured to support instant messaging and other communications. In one embodiment, network 110 is a public IM network for a particular network implementation (e.g. AIM, MSN, Yahoo!). For discussion purposes, network 110 includes any IM network located outside of firewall 108. For example, network 110 may be a public IM network (AIM, MSN, Yahoo), running on top of the Internet, or in some cases a proprietary IM network, running over an extranet (e.g., a VPN built on top of the Internet). Network 110 thus can include an AOL commercial IM network, an MSN commercial IM network, a Yahoo! commercial IM network, etc.

IM clients 112 are connected to network 110. IM clients 112 may include similar characteristics as described with regard to IM clients 102. However, in relation to firewall 108, IM clients 112 are located outside of network 104. While IM clients 112 may be located on their own enterprise network, for discussion purposes, IM clients 112 are considered public IM clients that may communicate with IM clients 102.

In one embodiment, instant message (IM) module 106 is configured to receive and forward instant message communications. The functionality of embodiments of IM module 106, and other devices described, may be implemented by software, hardware, or any combination thereof. In one embodiment, IM module 106 is a computing device, such as a server, PC, workstation, network computer, mainframe, and the like. In another embodiment, IM module 106 is a software module or plug-in. One example of IM module 106 embodied as a computing device is described further with respect to FIG. 5.

In one embodiment, IM module 106 may receive and forward instant message communications using different models. For example, a proxy model, a server model, an event model, or any combination thereof may be used and will be described in more detail below. Although only these models are described, it will be understood that a person skilled in the art will appreciate other models that may be used to receive and forward messages at IM module 106.

IM module 106 receives instant message communications associated with IM clients 102 of various network implementations. Thus, no matter what the network implementation of each IM client 102, IM module 106 can receive and process instant message communications sent for or from IM clients 102.

Once IM module 106 receives instant message communications from IM clients 102, IM module 106 is configured to determine a policy that is applicable for that instant message communication. The policies include actions that IM module 106 may take based on the instant message communication. After determining an applicable policy, IM module 106 performs the action associated with the policy for the instant message communication. Examples of actions that may be taken include recording the instant message communication, modifying the instant message communication, blocking the instant message communication, forwarding the instant message communication. Additional actions will be described below and it will be understood that the actions are not limited to these actions and a person skilled in the art will appreciate other actions that may be taken.

Figure 2:
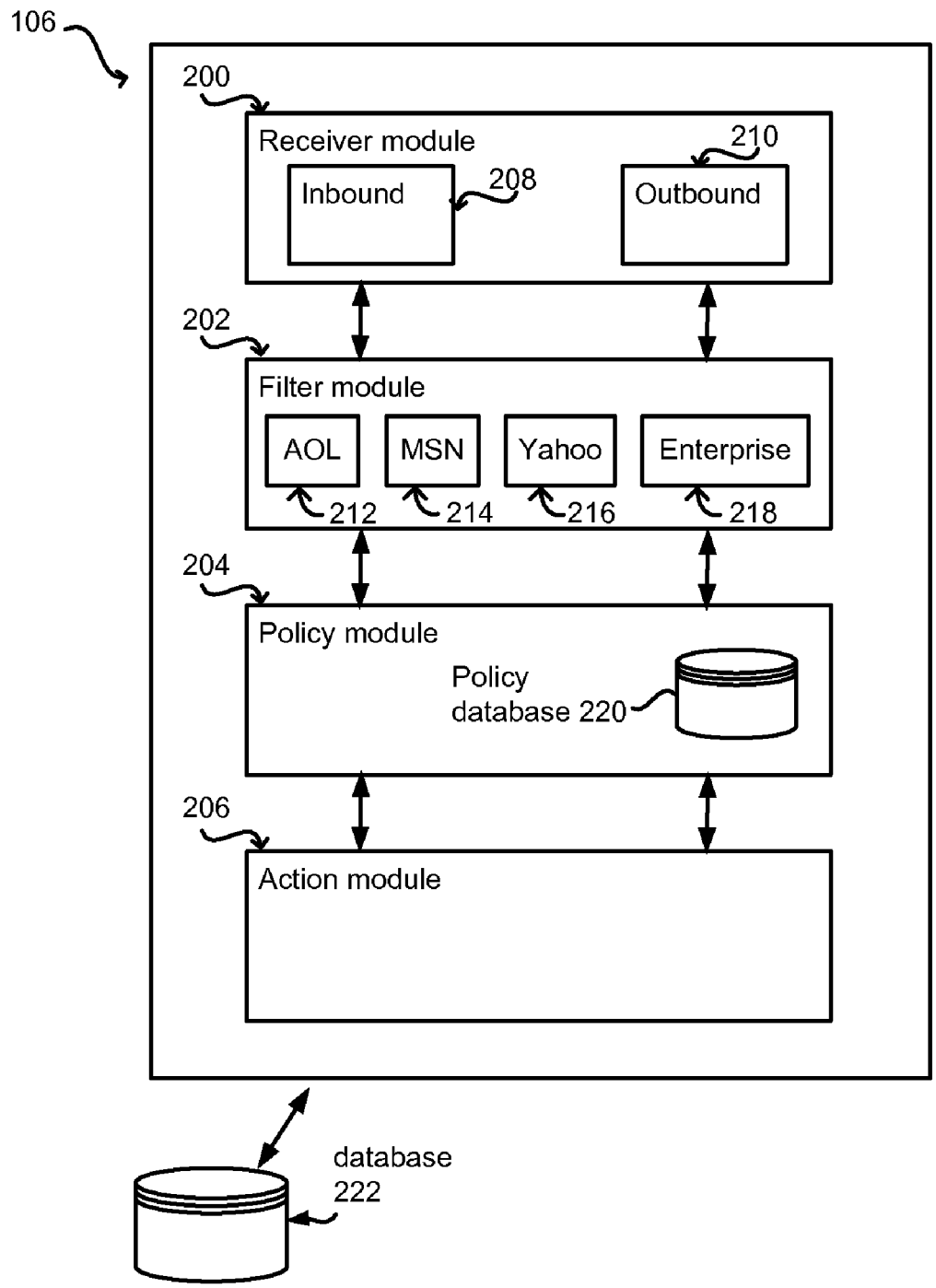
FIG. 2 illustrates an embodiment of an instant message module.

FIG. 2 illustrates an embodiment of IM module 106. IM module 106 includes a transceiver module 200, a filter module 202, a policy module 204, and an action module 206.

Transceiver module 200 is configured to receive and transmit (hence the name "transceiver", denoting the combination of "transmitter" and "receiver") instant message communications from IM clients 102 and IM clients 112. In one embodiment, transceiver module 200 includes an inbound transceiver module 208 and an outbound transceiver module 210. The inbound transceiver module 208 handles instant messaging communications on behalf of IM clients 102, and outbound transceiver module 210 handles outbound instant message communications on behalf of IM clients 112. For example, inbound transceiver module 208 receives instant message communications from IM clients 102 or sends IM communications to IM clients 102. Also, outbound transceiver module 210 receives IM communications from IM clients 112 or sends an IM communications to IM clients 112.

In one embodiment, transceiver module 200 receives instant message communications through different models, such as the proxy model, server model, and event model. Although only the above models are described below, a person skilled in the art will appreciate other models that may be used to receive messages at IM module 106.

When transceiver module 200 receives an instant message communication, transceiver module 200 sends the instant message communication to filter module 202. Filter module 202 is configured to then filter the instant message communication based on its network implementation. In one embodiment, filter module 202 includes one or more filters for the various network implementations. For example, an AOL filter 212, an MSN filter 214, a Yahoo! filter 216, and an enterprise filter 218 may be included in filter module 202. Although only these filters are shown in FIG. 2, it will be understood that other filters may be included in filter module 202. Each filter in filter module 202 filters instant message communications of a corresponding network implementation. Thus, AOL filter 212 filters instant message communications of an AOL network implementation, MSN filter 214 filters instant communications of a MSN network implementation, and so on.

In filtering the messages, filter module 202 converts an instant message communication received in the network implementation into an IM module format readable by policy module 204. For example, the instant message communications of different network implementations include different protocols. Filter module 202 filters the network implementation specific protocols for the IM communications and converts the IM communications to the IM module format. In one embodiment, the IM module format is a generic format. For example, the network implementation protocols may be removed in the generic format. Accordingly, an AOL instant message communication that is filtered by AOL filter 212 will be filtered into the IM module format, an MSN instant message communication will be filtered by MSN filter 214 into the IM module format, and so on.

Policy module 204 accesses a number of policies that include actions for instant message communications. In one embodiment, a policy database 220 stores the policies. As shown, policy database 220 is located in policy module 204; however, it will be understood that policy database 220 may be located anywhere in IM module 106 or be separate from IM module 106.

The policies in policy database 220 include actions that can be taken by instant message module 106. The policies may be applied to a certain instant message communication or multiple IM communications. Policy module 204 determines from characteristics related to the instant message communication whether any policies in policy database 220 apply to the IM communication. For example, policy module 204 may be configured to apply a disclaimer policy to all instant message communications that are received. Thus, when an instant message communication for a certain user is received, policy module 204 determines that the disclaimer policy applies to the instant message communication. In another example, the disclaimer policy may be applicable to IM communications for a user (or a group of users) in which case policy module 204 will determine that the disclaimer policy applies to IM communications for the user (or a group of users) when received. In another example, file transfers from IM clients 112 are scanned by a virus-checking program, while file transfers among IM clients 102 may not be scanned for viruses. In another example, certain groups of users are restricted from performing file transfers. In another example, certain IM content is detected, causing automatic prohibition of that message's transmission and/or an alert (via IM, email, etc.) sent to an administrator.

Once a policy is determined by policy module 204, action module 206 is configured to perform the action corresponding to the determined policy. For example, action module 206 may add a disclaimer to the instant message. Additionally, action module 206 may take one or more action(s) including but not limited to: storing the instant message, modifying the instant message, blocking the instant message, and forwarding the instant message, etc. Once the action is taken, the instant message communication is sent back to transceiver module 200, which may send the instant message to the applicable IM client assuming that the IM message was not blocked by action module 206. If the message is blocked, IM module 106 will not forward the instant message communication.

A database 222 may be used to store information usable for instant message module 106. Database 222 may be included in instant message module 106 or be separate from instant message module 106. In one embodiment, database 222 includes one or more information items including but not limited to: client identifications for IM clients 102, mapping information for IM clients 102, and policies that may be implemented by policy module 204. This information is used by modules in IM module 106 for any purpose.

As mentioned above, IM module 106 may be implemented in a proxy server model, a server model, an event model, or any combination thereof. In the proxy server model, IM module 106 is situated in network 104 and acts as a proxy server between IM clients 102 and network 110. IM module 106 supports any kind of enterprise proxy protocols, such as SOCKS, HTTP, HTTPS.

In the proxy server model, IM module 106 intercepts IM communications. In one example, IM clients 102 connect to IM module 106 by specifying IM module's 106 host and port in the proxy settings of IM clients 102. IM module 106 then connects to network 110 on behalf of IM clients 102. IM module 106 then connects to other IM clients (e.g., other IM clients 102 and/or network 110 in order to reach IM clients 112) for an IM client 102.

Referring to FIG. 1, in the proxy server model, a request is received by IM module 106. IM module 106 thus intercepts and processes the received IM communications, and then sends the response to network 110 or network 104 via SOCKS, or HTTP, or HTTPS (if necessary), or directly to network 110 or network 104.

In the server model, IM module 106 does not appear as a proxy for IM clients 102. Instead, IM clients 102 connect to IM module 106 in a client-to-server fashion. For example, IM clients 102 may connect using a protocol that is specially defined for use between the given IM client 102 and IM module 106.

In the event model, IM module 106 interacts with another IM server, such as an enterprise IM server that is deployed on network 104. The enterprise IM server is responsible for sending events to IM module 106. The events indicate that something related to instant messaging has taken place in the enterprise IM server (e.g., an IM client signed on/off; an IM client sent a text message to another IM client; an IM client has joined/left a chat room; the presence status of an IM client has changed; or the geographical location of an IM client has changed). Once receiving the event, IM module 106 may access the enterprise IM server through an interface (typically an application programmer's interface, or API for short) that allows IM module 106 to gain control of enterprise IM server functions. IM module 106 thus receives events encapsulating various details concerning instant message communications. If IM module 106 determines an action should be taken, IM module 106 can take the action by controlling the IM server through the API.

For example, an IM communication may be sent by the enterprise IM client 102 to the enterprise IM server. Upon receiving the IM communication, the enterprise IM server sends the corresponding event to IM module 106. IM module 106 intercepts the event, which includes the IM communication, and may then process the intercepted IM communication according to any applicable policies.

Figure 3:
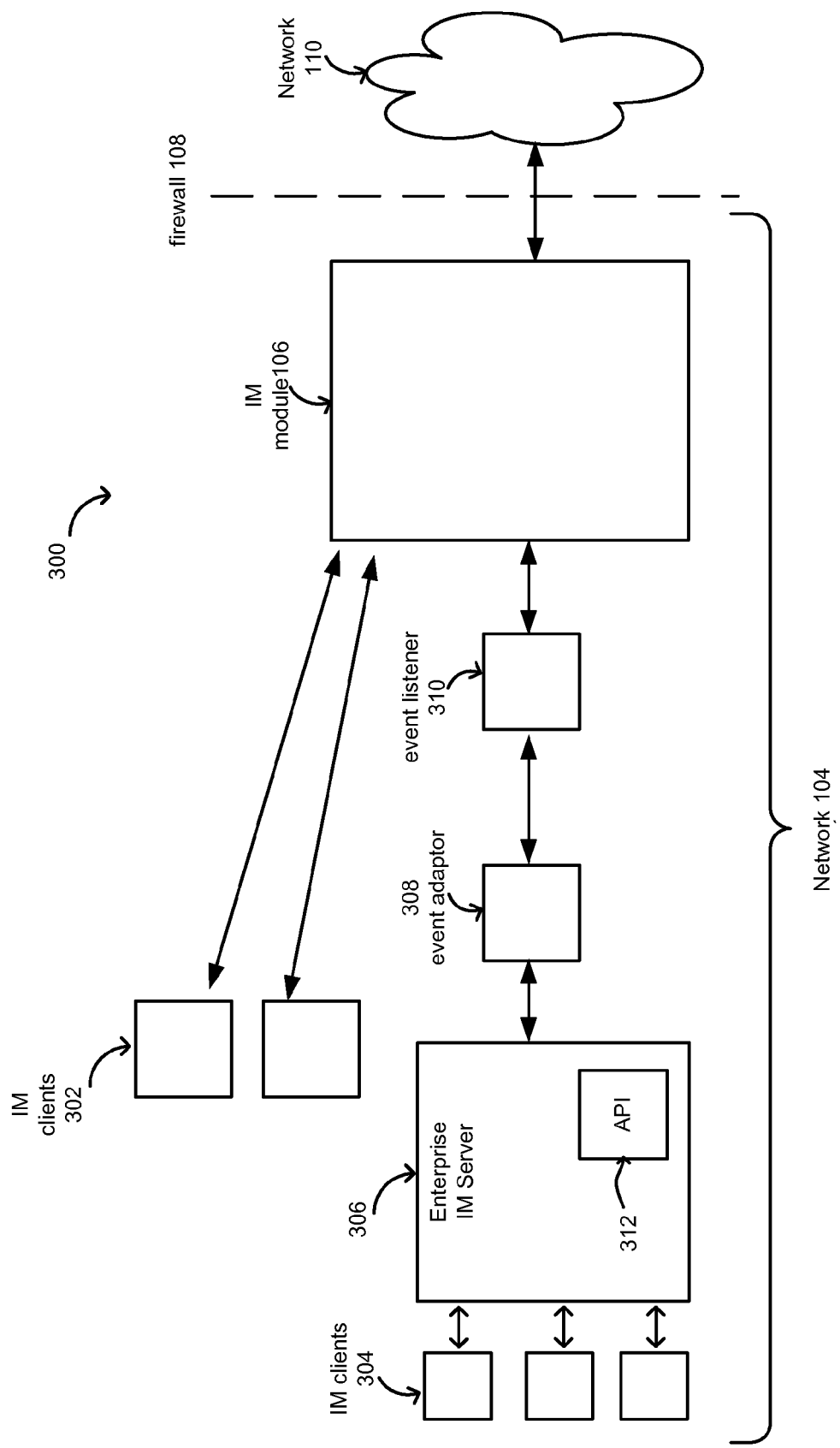
FIG. 3 illustrates an embodiment of an instant message system.

FIG. 3 illustrates one embodiment of an instant message system 300. This embodiment includes public IM clients 302 for one or more public IM network implementations and private IM clients 304 for one or more private IM network implementations.

As shown, FIG. 3 includes an enterprise IM server 306, an event adapter 308 and an event listener 310. Enterprise IM server 306 handles IM communications for enterprise clients 304. Enterprise IM server 306 also includes an API 312 that allows IM module 106 to access functions and controls of enterprise IM server 306.

When enterprise IM server 306 receives an IM communication, enterprise IM server 306 sends an indication through event adapter 308 to indicate that an event has occurred. Event listener 310 receives the indication and alerts IM module 106 of the event. IM module 106 then connects to enterprise IM server 306 through API 312 to intercept and receive the IM communication. IM module 106 then can process the IM communication as described above.

IM module 106 may also be configured in the proxy server model or server model for public IM clients 302. Public IM clients 302 connect to IM module 106 through methods described above, which allows IM module 106 to intercept IM communications to and from IM clients 302. IM module 106 also forwards the IM communications to and from IM clients 302 and connects to network 110 on behalf of IM clients 302.

Figure 4:
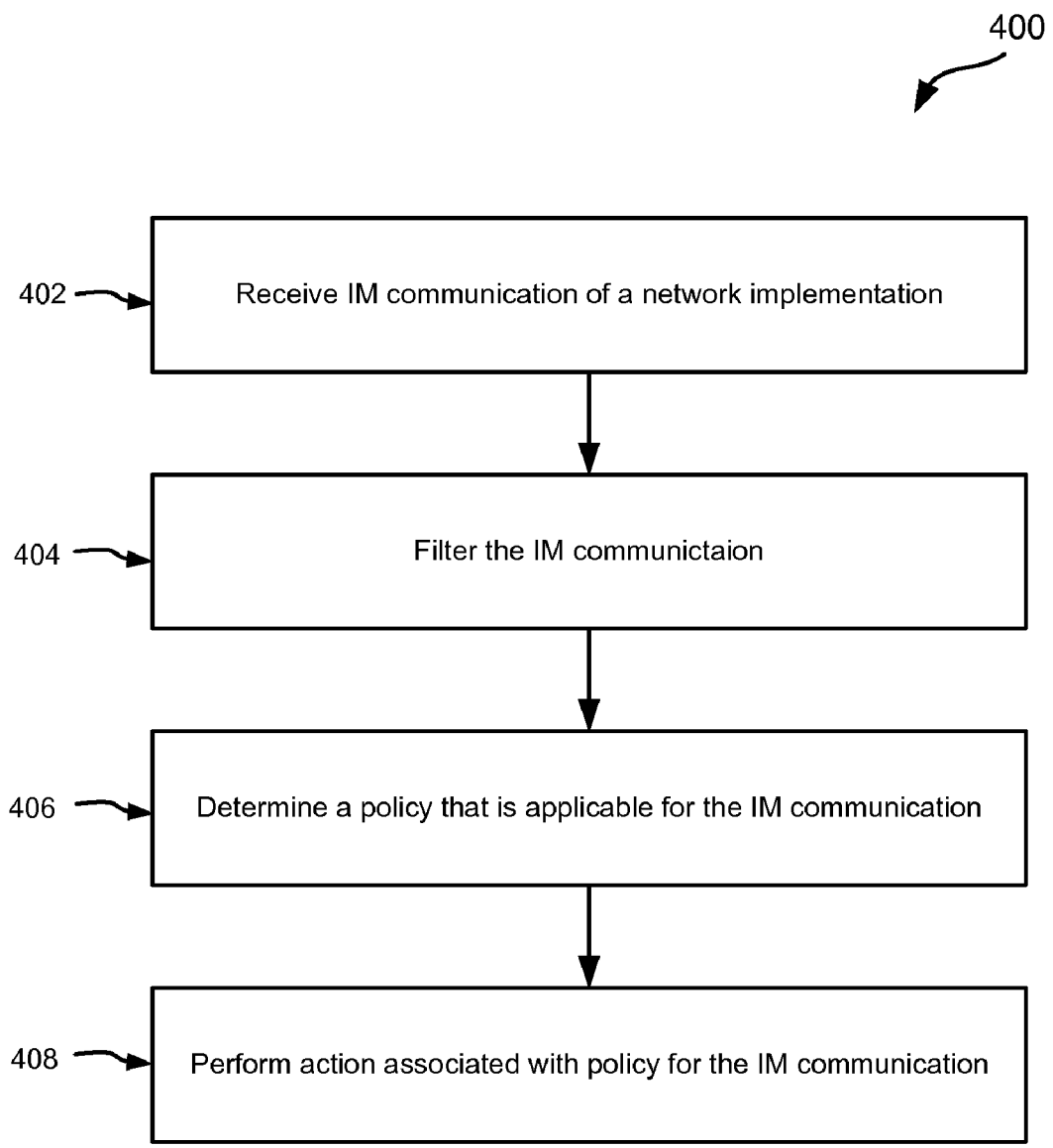
FIG. 4 depicts a simplified flow chart of a method for managing instant message communications according to one embodiment of the present invention.

FIG. 4 depicts a simplified flow chart 400 of a method for managing instant message communications according to one embodiment of the present invention. In step 402, IM module 106 receives an instant message communication of a network implementation. As mentioned above, the IM communications may be in any network implementation. In one embodiment, IM module 106 may receive the IM communication through the proxy, event, and/or server models.

In step 404, IM module 106 filters the IM communication in the network implementation into an IM module format. As mentioned above, the IM module format may be a generic format. In one embodiment, protocols that are associated with each of the network implementations are filtered from the IM communications. For example, AOL IM communications are filtered through AOL filter 212, MSN IM communications are filtered through MSN filter 214, and so on.

In step 406, IM module 106 determines a policy from a group of policies that is applicable for the IM communication in the IM module format. In one embodiment, policies are stored in policy database 220 and appropriate policies are retrieved based on characteristics of the IM communication. Also, IM module 106 may retrieve multiple policies for the IM communication.

Once one or more policies are determined to be applicable to the IM communication, in step 408, IM module 106 performs an action associated with the applicable policy for the IM communication. As discussed above, various actions, such as recording portions of the IM communication, modifying the IM communication, blocking the IM communication, and forwarding the IM communication, may be taken by IM module 106.

Embodiments of actions and implementations for IM module 106 will now be described. In one embodiment, IM module 106 may be used as an auditor for an enterprise. Some enterprises may be subjected to regulation and auditing of all conversations among employees, and between employees and outsiders. Thus, even instant message communications by employees are recorded.

IM module 106 may be configured to manage instant message communications of enterprise employees using IM clients 102 and perform the action of recording the content of all IM communications. Accordingly, the enterprise will be in compliance with regulations for recordings of all conversations with regard to instant messages.

IM module 106 may also be configured to store and reproduce any or all IM communications involving employees using IM clients 102 in their entirety. Additionally, reports showing the IM communications and when they occurred may also be produced.

Also, IM module 106 may be used to produce comprehensive reports on employee's usage of IM clients 102. In this case, IM module 106 will perform the action of storing all IM communications from IM clients 102 of different network implementations. Thus, no matter what network implementation of an IM client 102 is used, IM module 106 is able to record the employee's IM usage. The enterprise can thus monitor employee IM usage and its affect on employee productivity.

In another embodiment, IM module 106 may be used in securing an enterprise network. For example, IM module 106 may monitor IM communications to and from IM clients 102 and perform the action of a virus check or a check for other potential hazards associated with IM communications.

Also, IM module 106 may monitor IM communications for spam. In this case, IM module 106 processes IM communications to determine whether some IM communications are spam. If spam is detected, the IM communications are then flagged, blocked, or sent to a spam message folder. Other actions can be taken as well, e.g., alerting the administrator.

Moreover, IM module 106 may provide access control for network 104. For example, IM module 106 may impose control of principal communication features, such as sign-on privileges, internal enterprise routing or external routing, alerts, file transfers, chatting, and news/stock tickers, for each user using IM clients 102. In one example, IM module 106 may receive an IM communication from an IM client 102 with a request for logging onto an IM network. IM module 106 will then determine the sign-on privileges for the user and determine whether the user should be allowed to sign onto the IM network. IM module 106 will then perform the action of allowing the user to sign-on or blocking the user from signing on.

In another embodiment, IM module 106 may be used to map network identities, also known as buddy names or screen names, to corporate identities of the users of IM clients 102. A user may have a corporate identity that is used for other enterprise applications, such as email. In this example, an instant message communication may be received for a user that is associated with the user's network identity. IM module 106 will include a policy that will map the IM network identity to the corporate identity for the user. Thus, corporate identities may be mapped to identities used in commercial IM networks, allowing IT administrators to have a consistent view of how employees use the company's LAN (consistent in that a view includes all of a user's IM IDs associated with their assigned and recognized corporate ID). Otherwise, the administrator would have to track each network identity on public IM networks.

Also, the corporate identity may be mapped to a group of users. Thus, one identity may be mapped to multiple users' identities. IM module 106 may be used as a foundational platform for building other applications. For example, an automated call distribution (ACD) contact center application server may be implemented in an enterprise network to receive IM communications for the enterprise through a "universal-representative" identification. Because IM module 106 can map network identifications to corporate identifications, the universal-representative identification associated with the ACD server may be assigned to receive IM communications as a concentrator for the entire organization. This universal-representative (or universal-agent) identification may be thought of as a "1-800" telephone number that outside users can use. Thus, outside users contact the ACD server through the universal-agent identification, but internally agents are selected according to their corporate identifications and business policies.

Thus, a help desk identity may be established where an IM communication is sent to the help desk identity and then IM module 106 maps the help desk identity to multiple users that are working on the help desk and sends the instant message communication to all the help desk users of IM clients 102. The users may then choose to help the patrons to answer the question that was sent to the help desk identity.

In another variation, IM module 106 may use sequential routing for the group of enterprise users (in this example, help desk agents), where IM module 106 contacts each user of a group in a pre-determined order until a user responds. IM module 106 then connects the responding user to the customer and they can exchange instant messages. Also, a broadcast routing may be implemented by IM module 106 where all members of a group are contacted at once and the user responds as soon as selected and connected for communicating with a customer.

IM message module 106 then receives the IM communication through the universal identification and can map the universal identification to another user using any IM client 102. The mapping for the universal identification is implemented according to a policy and an action maps the universal identification to other identifications. In one example, depending on who is assigned to a help desk, IM module 106 can map the IM communication for the universal-representative identification to specific identifications for the help desk. Additionally, polices may be set up to map the universal-agent identification to specific users depending on the hours of the day and when the users both are scheduled to work.

In another embodiment, IM module 106 performs the action of managing presence for users. IM module 106 receives presence and availability information (in some cases location information as well) that is associated with the user's network identity in IM communications. An identity with presence, availability, and other auxiliary information associated with it may be referred to as a "presentity" (i.e., "identity with presence"). The presentity may become a group presentity when multiple users' identities with presence information are mapped to a (virtual) group identity. In one embodiment, the presence status of an IM client may indicate that the IM client is on-line, off-line, busy, unavailable, on a mobile device, or other status-related information. Moreover, the presence status may include geographic location information.

IM module 106 may receive IM communications indicating the presence status of IM clients 102 on network 104, IM clients 112 on network 110, and IM clients 304 on network 306. IM module 106 may provide and utilize an API to manage individual presentities and group presentities. The presence API makes generic the presence information obtained in received IM communications containing the presence status of individual users and groups of users. IM module 106 may also encapsulate the management of individual and group presentities for various commercial and enterprise networks in a dedicated component, such as "an IM Gateway" or "an IM Bridge".

Policies may be used by IM module 106 where presentities (i.e., individual and groups of IM clients 102 on network 104, IM clients 112 on network 110, and IM clients 304 on network 306) are managed. For example, IM module 106 may receive an IM communication indicating a change in the presence status of IM client 102, such as going from on-line status to off-line status. Depending on a policy applicable for that IM client 102, IM module 106 takes an action. In one example, an action may include connecting a first IM client trying to communicate with a second IM client with a different user of a third IM client because the second IM client presence status indicates the user is off-line, while the third IM client presence status indicates the user is on-line (i.e., the third user is present and available). For the ACD scenario described above, this could be interpreted as connecting the outside user to an available internal agent, such as the assistant of the agent who became unavailable. Another type of action, based on a change in the presence status of a single IM client 102, may include changing the status of a group presentity. For example, identities of IM clients 102 may be mapped to a help desk identity (which is a group of agents). When IM communications indicating the status change of one or more of the presentities of IM clients 102 are received, IM module 106 may take an action for the help desk group presentity based on a policy. If the presence status for an IM client 102 is on-line, then IM module 106 may make the presence status of the help desk presentity to be on-line. Accordingly, presence may be mapped between an identity for an IM client 102 and other identities. Moreover, presence may be mapped across multiple IM clients 102 of different network implementations.

A session is defined as the information associated with a client connected to a server. For example, a telephone connected to a call center is in session, until one side or the other hangs up. When two clients engage in a live conversation (voice, text, etc.), this is called an interaction. In the case of instant messaging, a session starts when the client signs on. During that time, the client may engage in interactions with other clients (that is, conversations containing one or more messages exchanged among the parties), receive alerts, change availability status, and so on. The session ends when the client signs off. Individual clients are presentities, and groups of clients are group presentities.

Individual and group identities can possess profiles consisting of other attributes, besides presence information. These profile attributes can be manipulated and policies applied to them as part of applications built on top of IM module 106 as a foundational platform. In some applications, it may be advantageous to specify a type of a client by a designated attribute (its values denoting an IM client, an email client, and so on). Since IM module 106 treats presentities, sessions, and interactions generically (possibly accessible via an API), it is possible to develop applications (such as the ACD system described above) that manage communications, flowing across these diverse media channels, in a unified way. In other words, text messaging, email, voice-over-IP (VoIP), and video are just different types of interaction media. While the media have differences (real-time or delayed-response, full-duplex or one-way, specific device types required, etc.), they can be managed uniformly (clients connect and disconnect, interactions start and stop, data flows across) for the identities involved.

In another embodiment, IM module 106 may take the action of providing an IM alert. In this embodiment, IM module 106 receives an IM communication that indicates IM module 106 should send an alert to a particular IM client 102 or a group of IM clients 102. Once receiving the indication, IM module 106 sends an instant message as a reminder for users of particular IM clients 102. For example, if a meeting is scheduled at 11:00 a.m., IM module 106 may receive an IM communication indicating IM module 106 should perform the action of sending an instant message to IM clients 102 that are participating in the meeting.

In another embodiment, IM module 106 performs the actions of implementing various business policies to IM communications. For example, IM module 106 then performs the action of examining messages as they travel between IM clients for objectionable content and other violations. In another example, IM module 106 may receive the IM communication, examine the communication for keywords that have been deemed objectionable and flag the IM communication if the keywords are found.

In another embodiment, IM module 106 may prevent IM communications from being sent and/or reaching their intended IM clients. In this case, IM module 106 may determine from the IM communication that IM communications to the recipient are not allowed. IM module 106 will then block the IM communication.

In another embodiment, IM module 106 may allow employees connected to the enterprise network to share files or block employees' IM clients 102 from sharing files with outside IM networks 110. For example, IM module 106 may enforce a policy for internal routing, where IM module 106 allows IM communications between employees behind the enterprise firewall. If an IM communication is for an external IM client 112, IM module 106 may block the IM communication. This is useful for intellectual property protection, among other benefits.

In another embodiment, the action of adding a disclaimer to an instant message communication may be taken. For example, a disclaimer may be added periodically or when an IM client starts interacting with another IM client for the first time.

Accordingly, IM module 106 uses its position in between an enterprise firewall and IM clients 102 used by employees of the enterprise to manage IM communications to and from the IM clients. IM module 106 receives IM communications for the enterprise and processes the communications according to policies implemented by the enterprise. Actions are then taken by IM module 106 according to the policies. An enterprise using IM module 106 can thus manage all IM communications no matter what the network implementation of the IM communications, because IM module 106 is situated to receive all IM communications.

Figure 5:
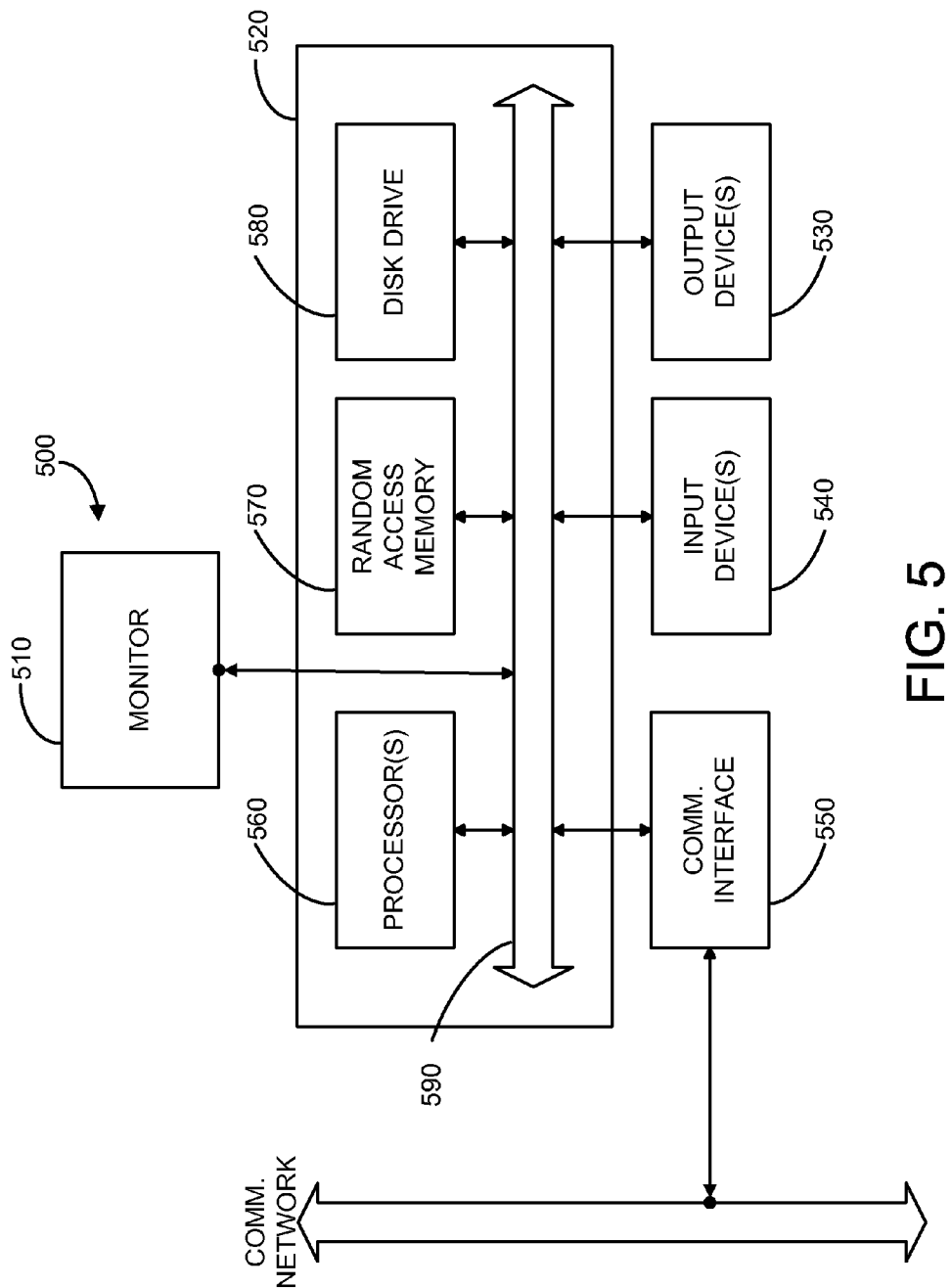
FIG. 5 is a simplified block diagram of a computing device for processing instant messages according to one embodiment of the present invention.

FIG. 5 is a simplified block diagram of computing device 500 for processing instant messages according to one embodiment of the present invention. FIG. 5 is merely illustrative of an embodiment incorporating the present invention and does not limit the scope of the invention as recited in the claims. One of ordinary skill in the art would recognize other variations, modifications, and alternatives.

In one embodiment, computing device 500 typically includes a monitor 510, a computer 520, user output devices 530, user input devices 540, communications interface 550, and the like.

As shown in FIG. 5, computer 520 may include a processor(s) 560 that communicates with a number of peripheral devices via a bus subsystem 590. These peripheral devices may include user output devices 530, user input devices 540, communications interface 550, and a storage subsystem, such as random access memory (RAM) 570 and disk drive 580.

User input devices 530 include all possible types of devices and mechanisms for inputting information to computer 520. These may include a keyboard, a keypad, a touch screen incorporated into the display, audio input devices such as voice recognition systems, microphones, and other types of input devices. In various embodiments, user input devices 530 are typically embodied as a computer mouse, a trackball, a track pad, a joystick, wireless remote, drawing tablet, voice command system, eye tracking system, and the like. User input devices 530 typically allow a user to select objects, icons, text and the like that appear on the monitor 510 via a command such as a click of a button or the like.

User output devices 540 include all possible types of devices and mechanisms for outputting information from computer 520. These may include a display (e.g., monitor 510), non-visual displays such as audio output devices, etc.

Communications interface 550 provides an interface to other communication networks and devices. Communications interface 550 may serve as an interface for receiving data from and transmitting data to other systems. Embodiments of communications interface 550 typically include an Ethernet card, a modem (telephone, satellite, cable, ISDN), (asynchronous) digital subscriber line (DSL) unit, FireWire interface, USB interface, and the like. For example, communications interface 550 may be coupled to a computer network, to a FireWire bus, or the like. In other embodiments, communications interfaces 550 may be physically integrated on the motherboard of computer 520, and may be a software program, such as soft DSL, or the like.

In various embodiments, computing device 500 may also include software that enables communications over a network such as the HTTP, TCP/IP, RTP/RTSP protocols, and the like. In alternative embodiments of the present invention, other communications software and transfer protocols may also be used, for example IPX, UDP or the like.

RAM 570 and disk drive 580 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like. RAM 570 and disk drive 580 may be configured to store the basic programming and data constructs that provide the functionality of the present invention.

Software code modules and instructions that provide the functionality of the present invention may be stored in RAM 570 and disk drive 580. These software modules may be executed by processor(s) 560. RAM 570 and disk drive 580 may also provide a repository for storing data used in accordance with the present invention.

RAM 570 and disk drive 580 may include a number of memories including a main random access memory (RAM) for storage of instructions and data during program execution and a read only memory (ROM) in which fixed instructions are stored. RAM 570 and disk drive 580 may include a file storage subsystem providing persistent (non-volatile) storage for program and data files. RAM 570 and disk drive 580 may also include removable storage systems, such as removable flash memory.

Bus subsystem 590 provides a mechanism for letting the various components and subsystems of computer 520 communicate with each other as intended. Although bus subsystem 590 is shown schematically as a single bus, alternative embodiments of the bus subsystem may utilize multiple busses.

FIG. 5 is representative of a computing device capable of embodying the present invention. It will be readily apparent to one of ordinary skill in the art that many other hardware and software configurations are suitable for use with the present invention. For example, the computing device may be a desktop, portable, rack-mounted or tablet configuration. Additionally, the computer device may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present invention can be implemented in the form of logic in software or hardware or a combination of both. The logic may be stored in a computer readable or machine-readable storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A non-transitory computer-readable storage medium storing a set of computer-executable code modules for handling instant message (IM) communications within a communications network, the plurality of instant message communications associated with a plurality of network implementations, the non-transitory computer-readable storage medium comprising:

code for receiving a plurality of policies for each network implementation in the plurality of network implementations that are applicable to characteristics of instant message communications associated with the corresponding network implementation in the plurality of network implementations, each policy defining:

a set of characteristics pertaining to at least one network implementation in the plurality of network implementations or content of one or more instant message communications in the at least one network implementation in the plurality of network implementations, and an action to be performed when one or more characteristics of at least one of the instant message communications satisfy the set of characteristics defined for the policy, wherein the at least one of the instant message communications is maintained unmodified in the at least one network implementation in the plurality of network implementations between instant message clients for the at least one network implementation by performance of the action defined in the policy;

code for receiving an instant message communication in a network implementation of one of the plurality of network implementations;

code for determining a policy from the plurality of policies that are applicable to characteristics of instant message communications in the network implementation based on one or more characteristics pertaining to the network implementation of the instant message communication or to content of the instant message communication in the network implementation;

code for filtering the instant message communication into a predetermined format from the network implementation of the instant message communication, where the predetermined format is different from the format of the network implementation;

code for filtering one or more portions of the instant message communication from the predetermined format into the same instant message communication in the network implementation associated with the instant message communication;

and code for performing an action defined by the policy that is determined to be applicable to the characteristics of the instant message communication using the predetermined format that is different from the format of the network implementation such that the network implementation of the instant message communication remains unchanged by performance of the action.

2. The non-transitory computer-readable storage medium of claim 1, wherein the code for receiving a plurality of policies for each network implementation in the plurality of network implementations the plurality of network implementations comprise code for receiving policies for at least two of a network implementation utilized by the America Online Instant Messenger application, a network implementation utilized by the Microsoft Messenger application, a network implementation utilized by the Yahoo Messenger application, and an enterprise network implementation.

3. The non-transitory computer-readable storage medium of claim 1, wherein the code for filtering the instant message communication comprises code for filtering the instant message communication into a generic format from the network implementation of the instant message communication.

4. The non-transitory computer-readable storage medium of claim 3, wherein the code for performing the action comprises code for performing the action on the generic format of the instant message communication;

and wherein the code for filtering the one or more portions of the instant message communication comprises code for filtering a remaining portion of the instant message communication after performance of the action from the generic format into the same instant message communication in the network implementation associated with the instant message communication.

5. The non-transitory computer-readable storage medium of claim 1, wherein the code for performing the action comprises code for storing the instant message communication.

6. The non-transitory computer-readable storage medium of claim 5, further comprising code for generating a report from the stored instant message communication.

7. The non-transitory computer-readable storage medium of claim 1, wherein the code for performing the action comprises code for virus checking the instant message communication.

8. The non-transitory computer-readable storage medium of claim 1, wherein the code for performing the action comprises code for determining whether the instant message communication includes spam.

9. The non-transitory computer-readable storage medium of claim 1, wherein the code for performing the action comprises code for modifying the content of the instant message communication such that the instant message communication remains unchanged in the computer system in the network implementation.

10. The non-transitory computer-readable storage medium of claim 9, wherein the code for modifying the content of instant message communication comprises code for adding content to the instant message communication.

11. The non-transitory computer-readable storage medium of claim 9, wherein the code for modifying content of the instant message communication comprises code for deleting at least a part of content of the instant message communication.

12. The non-transitory computer-readable storage medium of claim 1, wherein the code for performing the action comprises code for mapping an identification for an IM client associated with the instant message communication with another identification that comprises an identifier for a user associated within an organization or enterprise.

13. The non-transitory computer-readable storage medium of claim 1, wherein the code for performing the action comprises code for providing at least one of presence, availability, and location information using for an IM client.

14. The non-transitory computer-readable storage medium of claim 1, wherein the code for performing the action comprises code for blocking communication of the instant message communication within the communications network.

15. The non-transitory computer-readable storage medium of claim 1, wherein the code for performing the action comprises code for forwarding at least a portion of the instant message communication.

16. The non-transitory computer-readable storage medium of claim 1, wherein the code for performing the action comprises code for restricting access for an IM client associated with the instant message communication.

17. A non-transitory computer-readable storage medium storing a set of computer-executable code modules for managing instant message (IM) communications within a communications network, the plurality of IM communications associated with a plurality of network implementations, the non-transitory computer-readable storage medium comprising:
 code for receiving a plurality of policies for managing the IM communications in the plurality of network implementations, each policy defining:
 a set of characteristics pertaining to at least one network implementation in the plurality of network implementations or content of one or more instant message communications in the at least one network implementation in the plurality of network implementations, and an action to be performed that manages an instant message communication in the at least one network implementation in the plurality of network implementations when one or more characteristics of the instant message communication satisfy the set of characteristics defined in the policy such that the network implementation of the instant message communication remains unchanged by performance of the action defined by the policy;
 code for receiving instant message communications associated with the plurality of network implementations;
 code for filtering each of the received instant message communications that is in one of the plurality of network implementation formats into a predetermined format, wherein the predetermined format is different from the format of the network implementation of the instant message communications;
 code for filtering one or more portions of each received instant message communication from the predetermined format into the same instant message communication in the network implementation associated with the instant message communication;
 code for determining a policy from the plurality of policies for managing the plurality of IM communications that is applicable for each received instant message communication that has been filtered into the predetermined format, wherein the policy is determined based on whether one or more characteristics pertaining to the network implementation of each received instant message communication or to content of each received instant message communication satisfy the policy;
 and code for performing an action defined by the applicable policy for each received instant message communication that has been filtered into the predetermined format using the predetermined format.

18. The non-transitory computer-readable storage medium of claim 17, wherein the code for receiving a plurality of policies for each network implementation in the plurality of network implementations the plurality of network implementations comprise code for receiving policies for at least two of a network implementation utilized by the America Online Instant Messenger application, a network implementation utilized by the Microsoft Messenger application, a network implementation utilized by the Yahoo Messenger application, and an enterprise network implementation.

19. The non-transitory computer-readable storage medium of claim 17, wherein the code for performing the action comprises code for storing the instant message communications.

20. The non-transitory computer-readable storage medium of claim 19, further comprising code for generating a report from the stored instant message communications.

21. The non-transitory computer-readable storage medium of claim 17, wherein the code for performing the action comprises code for virus checking the instant message communications.

22. The non-transitory computer-readable storage medium of claim 17, wherein the code for performing the action comprises code for determining whether the instant message communications include spam.

23. The non-transitory computer-readable storage medium of claim 17, wherein the code for performing the action comprises code for modifying the content of the instant message communications such that the instant message communication remains unchanged in the network implementation.

24. The non-transitory computer-readable storage medium of claim 23, wherein the code for modifying the content of the instant message communications comprises code for adding content to the instant message communications.

25. The non-transitory computer-readable storage medium of claim 24, wherein the code for modifying the content of the instant message communications comprises code for deleting at least a part of content of the instant message communications.

26. The non-transitory computer-readable storage medium of claim 17, wherein the code for performing the action comprises code for mapping an identification for an IM client in the plurality of IM clients using the computer system with another identification that comprises an identifier for a user within an organization or enterprise.

27. The non-transitory computer-readable storage medium of claim 17, wherein the code for performing the action comprises code for providing at least one of presence, availability, and location information for an IM client in the plurality of IM clients.

28. The non-transitory computer-readable storage medium of claim 17, wherein the code for performing the action comprises code for blocking communication of the instant message communications within the communications network.

29. The non-transitory computer-readable storage medium of claim 17, wherein the code for performing the action comprises code for forwarding the instant message communications.

30. The non-transitory computer-readable storage medium of claim 17, wherein the code for performing the action comprises code for restricting access for an IM client in the plurality of IM clients.

31. The non-transitory computer-readable storage medium of claim 17, wherein the code for receiving the instant message communications comprises code for receiving an instant message communication in the instant message communications that includes presence information in a network implementation in the plurality of network implementations; and wherein the code for filtering each of the received instant message communications that is in one of the plurality of network implementation formats into the predetermined format comprises code for filtering the presence information in the network implementation for the received instant message communication into presence information in the predetermined format.

32. A non-transitory computer-readable storage medium storing a set of computer-executable code modules for managing instant messages within a communications network, the instant messages associated with a plurality of instant message protocols, the non-transitory computer-readable storage medium comprising:

code for receiving, at a network appliance that communicates with the communications network and is configured with a plurality of instant messaging modules that enable the network appliance to natively proxy instant messages within the communications network between instant messaging clients of an instant messaging network using the plurality of instant messaging protocols, a set of instant messaging policies for each of the plurality of instant message protocols, each instant messaging policy in the set of instant messaging policies specifying:

a set of characteristics pertaining to at least one instant message protocol in the plurality of instant message protocols or content of one or more instant messages in the at least one instant message protocol, and an action to be performed when one or more characteristics of an instant message in the at least one instant messaging protocol associated with the instant messaging policy is satisfied by the set of characteristics specified by the instant messaging policy;

code for receiving an instant message from a first instant message client operating on a first device, the instant message using a first instant message protocol in the plurality of instant message protocols and destined for an instant message network in the plurality of instant message networks accessible to the network appliance whose clients communicate using the first instant message protocol;

code for determining whether an instant messaging policy is applicable to the instant message based at least in part on matching a characteristic of the instant message using the network appliance to a characteristic in the set of characteristics specified by the instant messaging policy;

code for determining an action to be performed on the instant message from information specified by an instant messaging policy that is determined to be applicable to the instant message;

code for filtering the instant message at the network appliance into a predetermined format that is different from the format of the first instant message protocol;

code for filtering one or more portions of the instant message from the predetermined format into the first instant messaging protocol;

code for performing the action such that content of the instant message is modified as the instant message is preserved in the first instant message protocol by performance of the action, wherein the action is performed in part using the predetermined format;

and code for transmitting the modified instant message in the first instant message protocol to the instant message network.

33. The non-transitory computer-readable storage medium of claim 32, wherein the code for code for performing the action such that content of the instant message is modified comprises code for adding content to the instant message.

34. The non-transitory computer-readable storage medium of claim 32, wherein the code for code for performing the action such that content of the instant message is modified comprises code for deleting at least a part of the content of the instant message.

* * * * *